(12) United States Patent
Reynolds

(10) Patent No.: US 8,145,688 B2
(45) Date of Patent: Mar. 27, 2012

(54) TOOLS AND TECHNIQUES FOR ORIGINAL DIGITAL FILES

(76) Inventor: Mark L. Reynolds, Provo, UT (US)

(*) Notice: Subject to any disclaimer, the term of this patent is extended or adjusted under 35 U.S.C. 154(b) by 0 days.

(21) Appl. No.: 12/910,147

(22) Filed: Oct. 22, 2010

(65) Prior Publication Data

US 2011/0035360 A1  Feb. 10, 2011

Related U.S. Application Data

(63) Continuation of application No. 11/840,723, filed on Aug. 17, 2007, now abandoned, which is a continuation-in-part of application No. 09/999,774, filed on Oct. 24, 2001, now Pat. No. 8,032,542.

(60) Provisional application No. 60/243,617, filed on Oct. 26, 2000, provisional application No. 60/823,677, filed on Aug. 28, 2006.

(51) Int. Cl.
  G06F 12/00 (2006.01)
  G06F 7/00 (2006.01)
  G06F 9/44 (2006.01)
  G06F 9/445 (2006.01)
  G06F 9/00 (2006.01)

(52) U.S. Cl. ........ 707/828; 707/758; 707/696; 707/822; 717/169; 717/175; 717/177; 713/2

(58) Field of Classification Search ........... 707/999.009, 707/999.102, 822, 828; 713/153, 156, 161, 713/176, 2; 717/169, 175, 177
See application file for complete search history.

(56) References Cited

U.S. PATENT DOCUMENTS

| | | | | |
|---|---|---|---|---|
| 5,832,520 A * | 11/1998 | Miller | ................................. | 1/1 |
| 5,937,160 A * | 8/1999 | Davis et al. | ................... | 709/203 |
| 6,279,109 B1 * | 8/2001 | Brundridge | ....................... | 713/2 |
| 6,393,420 B1 * | 5/2002 | Peters | ................................. | 1/1 |
| 6,418,555 B2 * | 7/2002 | Mohammed | ................. | 717/169 |
| 6,604,238 B1 * | 8/2003 | Lim et al. | ..................... | 717/177 |
| 6,658,403 B1 * | 12/2003 | Kuroda et al. | ........................ | 1/1 |
| 6,865,673 B1 * | 3/2005 | Nessett et al. | ................. | 713/155 |
| 6,952,823 B2 * | 10/2005 | Kryloff et al. | ................. | 717/170 |
| 7,069,581 B2 * | 6/2006 | Fu et al. | ............................ | 726/3 |
| 7,761,606 B2 * | 7/2010 | Sunder et al. | ................. | 709/250 |
| 2001/0042112 A1 * | 11/2001 | Slivka et al. | .................. | 709/220 |
| 2003/0014671 A1 * | 1/2003 | Henson et al. | ................ | 713/201 |
| 2004/0221161 A1 * | 11/2004 | Rhoads | ........................ | 713/176 |
| 2006/0136514 A1 * | 6/2006 | Kryloff et al. | ................. | 707/203 |

* cited by examiner

*Primary Examiner* — Mohammad Ali
*Assistant Examiner* — Bao Tran
(74) *Attorney, Agent, or Firm* — Ogilvie Law Firm

(57) ABSTRACT

The present invention provides tools and techniques for distinguishing a file from any or all copies of the file that may exist. One method ascertains (204) the actual physical location of the file (512) and associates (214) that physical location with the file as the claimed physical location (516) of the file. The file's originality status may then be determined (104) by finding (304) the location claim, reading (306) from it the claimed physical location associated with the file, ascertaining (308) the actual physical location of the file, and comparing (310) the locations. If the claimed and actual locations are identical, then the file is the original file it claims to be. If there is disparity between the claimed physical location recited for or by the file and the actual physical location of the file, then it is not the original file it claims to be.

6 Claims, 4 Drawing Sheets

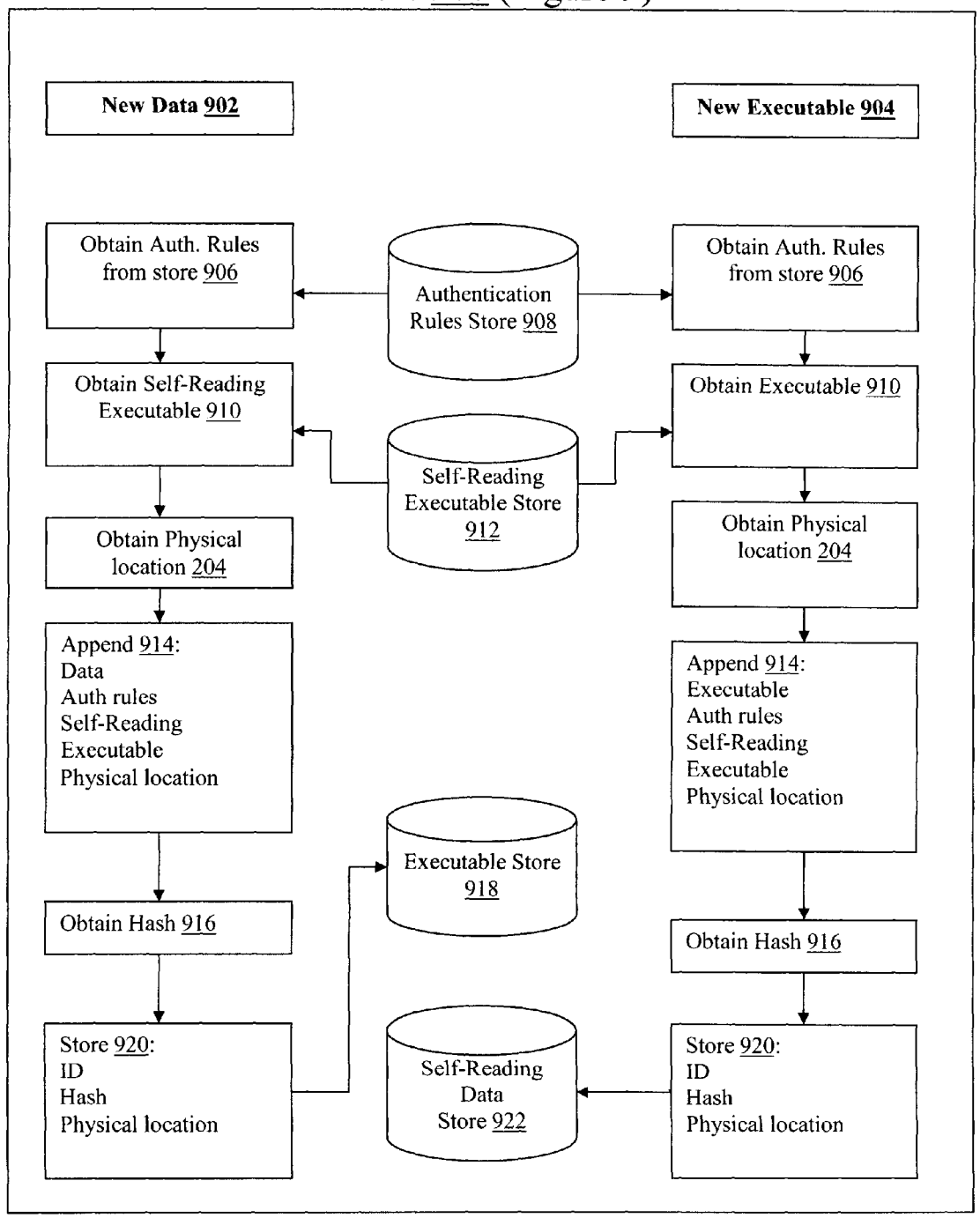

TOOLS AND TECHNIQUES FOR ORIGINAL DIGITAL FILES

RELATED APPLICATIONS

The present application is a continuation of application Ser. No. 11/840,723 filed Aug. 17, 2007 now abandoned, which is a continuation-in-part of U.S. patent application Ser. No. 09/999,774 filed Oct. 24, 2001 now U.S. Pat. No. 8,032,542, which claims priority in turn to U.S. provisional patent application Ser. No. 60/243,617 filed Oct. 26, 2000, all of which are also incorporated herein by reference. The present application also claims priority to U.S. provisional patent application Ser. No. 60/823,677 filed Aug. 28, 2006, which is also incorporated herein by reference.

FIELD OF THE INVENTION

The present invention relates generally to document management in computer systems, and relates more particularly to tools and techniques for distinguishing a given computer file from any other file or any copy of the given file, even if their contents are bitwise identical, by comparing actual and claimed physical file locations, as well as tools and techniques for creating, managing, and using such files.

TECHNICAL BACKGROUND OF THE INVENTION

It has long been the case that computer systems were unable to distinguish between a given file and an exact copy of that file. In computer systems, when a file is copied to create another file, it is replicated bit for bit in such a way that the two files have identical content. Thus, it has been impossible to know whether a file is an original or a copy by simply looking at the file's content.

In situations where it is important to be able to identify a file as an "original" file, strategies have been developed to designate a file as an "original" and to protect it with security, agreements, and procedures that make it possible for a custodian of a file to certify that it is the agreed upon "original." However, the precise meaning of "original", and the procedures taken, have varied significantly from one situation to the next.

For instance, many computer programmers are familiar with source code version control tools such as the Source Code Control System ("SCCS") and the Revision Control System ("RCS"). These programs can also be used for version control of files that contain content other than source code, such as the text of technical articles. Similar document management software, which tends to be used more with natural language texts than with program source code, often uses the same library paradigm as RCS and SCCS. That is, managed files reside in a library, which may be implemented as a directory with file system access restrictions. A file must be "checked-out" of the library for editing by the file's creator or another authorized person. The version control program detects and records any revisions to the document in question after it is "checked-in" (returned to the library). Locks may be imposed, so that only one person can edit the file at a time; other people must wait until it is checked-in and then check-out the file in turn to edit it.

Details about the actual structures and steps used by at least some version control programs are available on the Internet; some of that information is summarized here for convenience and/or is provided elsewhere in the application file history. Version control programs keep an administrative history file which records the changes made to a given library file. They track the original library file's content, and they also keep "delta" information that reflects subsequent changes to the original content. RCS keeps the original content and the deltas in a single file, while SCCS maintains several files. Both these programs follow and rely upon specified file naming conventions. Both of them also rely on conventions regarding directory paths: by default, RCS looks for RCS files in the current directory or in an RCS subdirectory, or an alternate can be specified; the SCCS front end looks for SCCS files in an SCCS directory, but a full filename may also be specified.

Because they focus on version control, these programs are apparently concerned more with reconstructing file content for a given version than with preventing changes to that content. Indeed, content changes are expected. Changes are somewhat controlled (e.g., by the file check-out procedure), and changes are normally tracked so that different versions can be reproduced. But unauthorized changes to an original file would not be difficult to make. For instance, one can apparently substitute a new "original" into RCS or SCCS, with the same or different content, by simply specifying an alternate file path and name. Also, it is apparently possible for someone who has sufficient file system access privileges to effectively change the content that these programs treat as "original" by accessing the file directly rather than going through the version control system's check-out procedure, editing the original content, and then overwriting the original file with the edited version. Care would need to be taken to avoid edits that are inconsistent with delta information, e.g., by removing entirely a line of text that is referenced by a delta so that the reference fails to find an operand. But many substantive edits could apparently be made, after which the version control system would treat the edited version as if it were actually the original. Some version control systems compute a checksum and place it in the revision file, but that checksum could be replaced by another which is computed from the edited content that will masquerade as the "original" content. In short, version control systems may treat either or both of two or more files as the "original" file when the content and context of the file meet relatively loose restrictions.

Another situation which deals generally with a distinction between an "original" and a copy is the installation of software that is "copy protected" to discourage unauthorized reproduction. However, the important distinction in this situation is not between a single original file and copies of that file, but is rather between one or more authorized copies of some master file, on the one hand, and one or more unauthorized copies of that master file, on the other hand. There may be many authorized copies of an executable file, for instance, since there may be many licensed users, and each authorized copy is treated as that user's "original" of the software.

The authorized copies of a given copy protected file may be bitwise identical, or they may differ slightly, depending on the copy protection scheme that is used. For example, U.S. Pat. No. 5,513,260 discusses copy protection technology which checks for an Authenticating Signature on compact disks. When an illicit copy of a protected disk is made, it may contain a faithful replica of the disk's program data but it will lack the Authenticating Signature and thus be distinguishable from authorized copies. U.S. Pat. No. 5,615,061 discusses copy protection technology which uses bad disk sectors to generate an identification number identifying a particular magnetic storage device. The identification number is placed on a software distribution disk the first time the software is installed from that distribution disk. When installation is requested, the distribution disk is checked to see if it already has an identification number; if so, then the software was already installed from that particular distribution disk, and it may be installed again only if the identification number on the distribution disk matches the identification number generated from the bad sectors of the magnetic disk that would receive the installation. One authorized distribution disk may thus differ from another by having a different identification number.

A situation that distinguishes between an original and copies in yet another way is discussed in U.S. Pat. No. 5,319,562. This patent discusses technology for purchasing postage with a personal computer and then printing metered envelopes. The data stream containing a postage meter mark could be captured on its way to the printer from a metering program, and placed in a file instead of being immediately printed. If the image of a metered envelope were captured in this manner, it could be printed an unlimited number of times without using the patent's postage metering program. Accordingly, the postage program assigns a unique serial number to every printed envelope. The postage program also directly controls the printer to prevent end users from printing more than one copy of any envelope with the same serial number. By capturing and storing the serial numbers on all mail pieces, and then periodically processing that information, the postal service can detect fraudulent duplication of metered envelopes. Apparently, unused duplicates are harmless, and using only one duplicate while discarding the original would not burden the postal service with letters for which no postage was paid. From the postal service perspective, the important distinction is thus not between the originally printed meter mark and some copy of it, but is instead between the first used meter mark and any subsequently used meter marks, regardless of whether the first used mark was the original printed by the postage program or was a duplicate of that printing.

Another situation in which distinctions can be made between an "original" and a copy is the situation in which a legitimate program is replaced by a "Trojan horse" that masquerades as the original program but also performs hidden functions such as copying passwords, copying or altering files, tracking user activity, and so on. This situation is similar to the version control situation discussed above, in that distinctions based on file content are important. It resembles copy protection situations in that many legitimate copies of a program may co-exist, with each treated as a given user's "original" program.

Encryption and related technologies such as steganography have been used to create digital signatures and digital watermarks that can be used to authenticate digital documents, that is, to determine whether the digital content of a file has been altered. Examples and references are discussed in U.S. Pat. No. 5,765,176, which is titled "Performing Document Image Management Tasks Using an Iconic Image Having Embedded Encoded Information." The iconic images discussed in this patent are reduced size partial copies of larger documents, and the images may be embedded in their respective larger documents. An iconic image appears at first glance to be a simple "thumbnail" representing the larger document, but the iconic image can hold encoded information such as a digital signature computed from the original content of the larger document, and a URL for locating a file containing that content.

U.S. Pat. No. 6,144,745 discusses technology for retaining and verifying file data on a recording medium. Logs, digital signatures, hash functions, time data, and medium identification numbers are discussed. Claim 1 is directed to a method of retaining N+1 documents on a recording medium such as a magneto-optical disk. The method apparently computes an authenticator$_N$ based on data in a document$_N$, records authenticator$_N$ and the data of document$_N$ on the medium, and then computes an authenticator$_{N+1}$ based on authenticator$_N$ and data in a document$_{N+1}$. That is, the authenticator for the second, third, fourth etc. document apparently depends not only on the content of that document but also on the authenticator for the previous document. According to the Summary of the Invention, this makes it "possible to warrant a continuity of the documents and easily detect illegal acts such as a falsification of an intermediate document and a disposal of the intermediate document, and to therefore restrict the illegal acts against the documents."

In summary, distinctions between an "original" file and copies of that file can be made in a variety of ways. Version control programs and Trojan horse detection tools try to distinguish between file content that is treated as original (but might not be) and revisions of that content. Copy protection technologies distinguish between authorized copies and unauthorized copies, and permit many users to each license their own authorized "original" files. Postal metering programs and procedures distinguish between the original use of a serialized meter mark and any subsequent use, regardless of whether the originally used mark was on the originally printed envelope or copied onto another envelope. Digital signatures may be used to determine if the content of a digitally signed file was altered after the signature was first computed, and may be used in some cases to help determine whether files that were originally recorded in a particular order have been rearranged and/or copied to another medium. Existing approaches tend to treat any file as an original if enough bits in the file and in its immediate context satisfy the authenticity criteria, even when the file is not a unique original.

It would be an improvement in the art to provide a new computer implemented method for distinguishing a single file from all other copies in an automated way. This would allow identification of a unique original of a file, of serialized copies of a file such as certificates or "certified copies" of an original digital file, and of administrative copies such as backups or mirrored copies. Tools and techniques for creating, managing, and using an original file based on its unique physical location are described and claimed herein.

BRIEF SUMMARY OF THE INVENTION

The present invention provides tools and techniques for identifying a file distinct from any or all copies of the file that may exist. One method includes identifying the actual physical location of the file and associating that physical location with the file itself as the claimed physical location of the file. Once this has been done, the originality status of the file may be determined by reading data that recites the claimed physical location that is associated with the file, determining the actual physical location of the file, and comparing the locations. If both locations are identical, the file is the original file it claims to be. If there is disparity between the claimed physical location recited for or by the file and the actual physical location of the file, then it cannot be the original file. One implementation associates the claimed location of the file with the file by writing the claimed physical location inside the file as a header or footer. Then verifying the originality status of the file can be done by reading the claimed location from the file, ascertaining its physical location, and comparing the claimed and actual location identifiers, without the necessity of referring to external sources to read the location claim.

Although many of the examples given herein are methods, the invention also provides other embodiments, such as systems and configured computer-readable storage media, for instance. The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The present invention is defined by the claims ultimately granted, and to the extent this Summary conflicts with the claims, the claims should prevail. Other aspects of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not necessarily limit the invention's scope. In the drawings:

FIG. 9 is a block diagram illustrating a system, memory configuration, and process which is an alternative to that shown in FIG. 5, according to the present invention, in which self-reading data is managed.

DETAILED DESCRIPTION OF PREFERRED EMBODIMENTS

Figure 1:
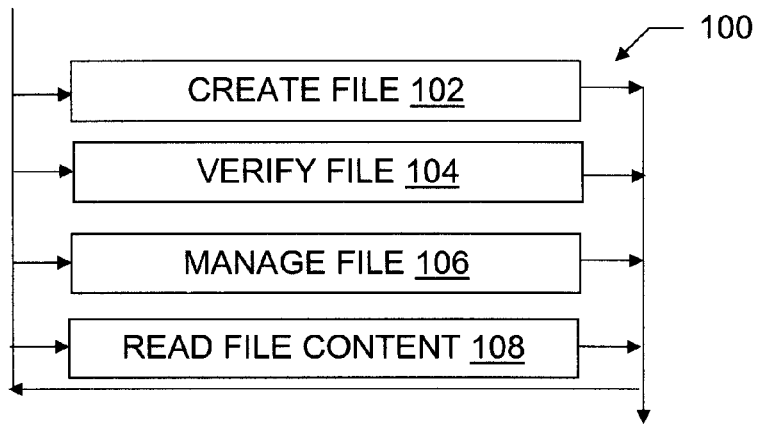
FIG. 1 is a flowchart illustrating generally methods for creating, verifying, and using digital files according to the present invention.

Reference will now be made to exemplary embodiments such as those illustrated in the drawings, and specific language will be used herein to describe the same. But alterations and further modifications of the inventive features illustrated herein, and additional applications of the principles of the invention as illustrated herein, which would occur to one skilled in the relevant art(s) and having possession of this disclosure, should be considered within the scope of the invention. Any apparent inconsistency in the disclosure should be read to broaden the scope of the disclosure.

In describing the invention, the meaning of terms is clarified, so the claims should be read with careful attention to these clarifications. Specific examples are given to illustrate aspects of the invention, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. The inventor asserts and exercises his right to provide his own lexicography. Terms may be defined, either explicitly or implicitly, here, elsewhere in the Detailed Description, and/or elsewhere in the application file.

In some embodiments, the present invention relates to tools and techniques for distinguishing a given computer file from any other copy of the file by comparing the actual physical location of the file with a claimed physical location: if the locations match, then the file is the original. If the locations do not match, or if there is some other critical inconsistency such as a mismatch in a digital signature or checksum, then the file is not the original. Tools and techniques are provided for creating original files, for verifying their status, for moving or copying them in secure ways, and for using them and their contents.

Comment on Logical Identifiers

The present invention relies heavily on differences between possible physical locations for a given file. This reliance is contrary to a general tendency of computer technology, which is to make the specific physical location of data a relatively obscure and flexible component of most computing systems. Toward that end, conventional systems make widespread use of "logical" identifiers that are mapped in a transparent and flexible way to physical data storage locations. Examples of logical identifiers include file names, domain names, and other resource names which are often selected for their meaning to people rather than their explicit identification of a particular physical location. Logical names are conventionally mapped onto one or more physical location identifiers, such as disk sector addresses or network machine addresses. This mapping permits people to use names that make sense to them while facilitating copying and permitting the system to locate (and move) the data and other resources sought by users.

The process of mapping a logical identifier into one or more physical location identifiers is sometimes called "name resolution". For instance, web site www.handle.net discusses "a general-purpose global name service that allows secured name resolution and administration over the public Internet. The Handle System manages handles, which are unique names for digital objects and other Internet resources." The same site also discusses the Domain Name System, which maps domain names into IP addresses, and Uniform Resource Locators (URLs), which are logical identifiers that get mapped into a combination of an IP address and a local file name or service.

In general, although a logical identifier must be ultimately mapped into some physical location identifier to access the data sought, a conventional computing system will work fine even if the data is moved or copied to another physical location and the resulting data is then used instead of the original data at the original physical location. Moreover, it is often possible to make substantial changes in the data content of a file when the file is moved or copied, and to do so without triggering alarms or making the system nonfunctional. That is, suppose the first use of a logical identifier leads to data A from physical location A, the next use of the same logical identifier leads to a copy of data A from physical location B, and the third use of the logical identifier leads to semantically altered but syntactically unchanged data A' from physical location C. Most computer systems will not treat any of these events as a cause for concern.

Indeed, a primary reason for using logical identifiers is to permit transparent movement of data to different physical locations to improve efficiency. Caching, directory service replication, disk mirroring, web site mirroring, disk defragmenters, partition resizers, and tools for image migration to a new disk are some examples of conventional technologies that generally assume a transparent and flexible mapping is made between logical identifiers and physical data locations. By requiring a match between the actual physical location of a file and the claimed physical location of that file as a condition of file originality, embodiments of the present invention depart from the common computing system preference for highly flexible and transparent logical-to-physical mappings.

Methods

FIG. 1 illustrates generally several methods 100 for creating, verifying, and using digital files according to the present invention. During a file creating step 102, a unique original file can be created. The file is original in that with the invention it can be distinguished, not only from other files that contain partial or altered data, but also from other files even when they contain exactly the same data. Creation of inventive files is discussed further in connection with FIG. 2.

During a file verifying step 104, the originality status of a file can be determined. That is, inventive embodiments can determine whether a given file is an original file. Some embodiments verify that a file is in the claimed location, and some also verify that the file's contents have not been altered. Some embodiments can attempt verification, and in addition can report in detail any discrepancies (e.g., file moved, file contents altered) if the file is not verified. File verification is discussed further in connection with FIG. 3.

During a file managing step 106, original files can be copied, moved, and/or deleted in secure ways. Security can be provided through file system access control, through encryption, through digital signatures or checksums, and/or through logs that track specific operations. To prevent unnecessary repetition, hash functions may be considered examples of digital signatures for the purpose of providing security in the present invention, unless specific reference is made to a "hash" function or digest. File management is discussed further in connection with FIG. 4.

During a file reading step 108, substantive data is read from one or more original files. Substantive data comprises data which is not present solely to implement the invention. Substantive data will often be supplied by the user. In an inventive system for creating and using unique original land ownership documents, for instance, the substantive data could include the grantor name, the grantee name, the grantee's address, the legal consideration paid, the date of ownership transfer, and a legal description of the property's metes and bounds. A location claim specifying the actual physical location of this data would not be substantive file content, even if it were included in the same file as the grantor name, grantee name, etc. Reading 108 a file is one example of "using" a unique original file. Other uses comprise displaying substantive content and/or printing it.

With respect to FIG. 1 and the other method figures, it should be noted that illustrated (or otherwise detailed) steps in methods of the invention may be omitted from a claim or an embodiment, although claimed steps cannot be omitted for purposes of literal infringement analysis. For instance, claims may be directed to file verification such as in step 104 without explicitly requiring file creation 102, even though an original file must be created before its originality status can be verified. As a more extreme example, purchasing or otherwise obtaining access to a computer is a prerequisite to performing many claimed inventions, but that is well understood in the art and therefore need not be explicitly claimed or described. Likewise, it should be noted that steps in methods of the invention may be performed in a different order and/or may be performed concurrently, although steps which depend on the effects of other steps must be performed only after the required results are available. For instance, a given embodiment may read 108 file content before verifying 104 a file, even though the opposite order is shown in FIG. 1. Steps may also be repeated, named differently, and/or grouped differently than shown in the illustrations.

Figure 2:
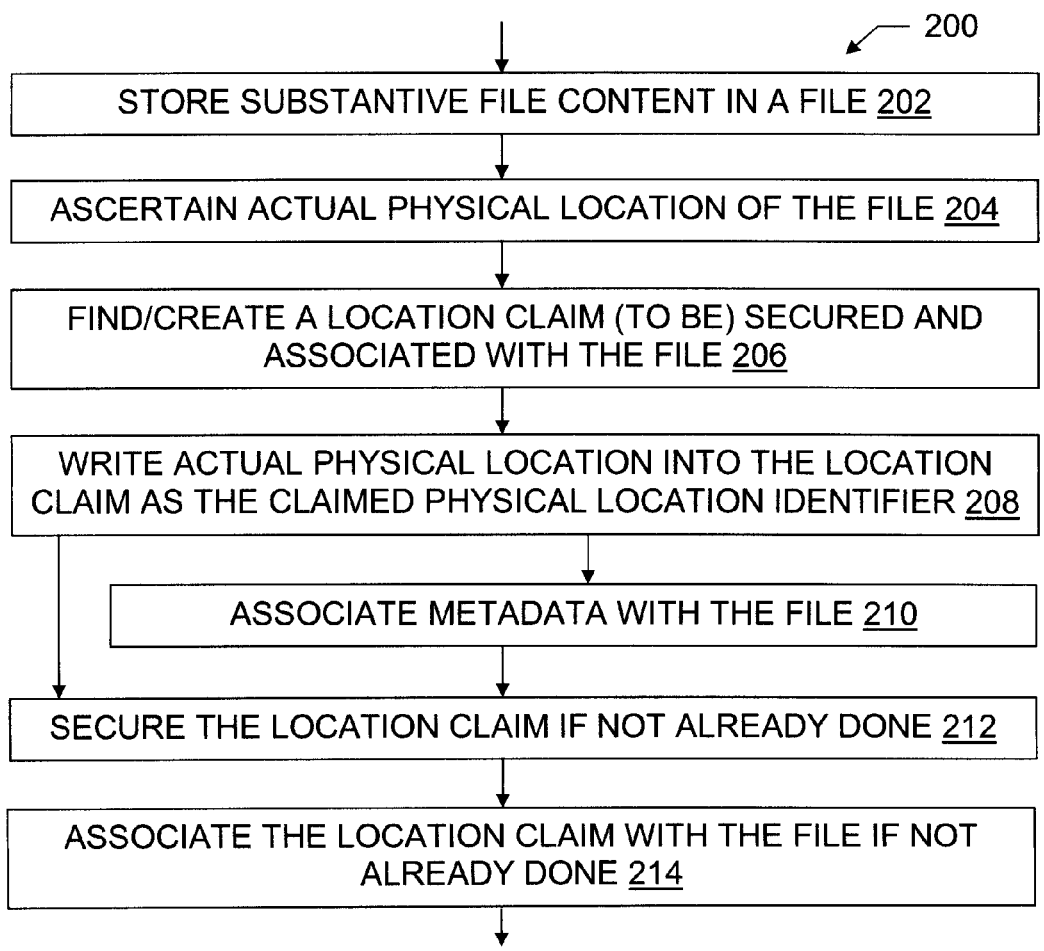
FIG. 2 is a flowchart illustrating steps that may be used in methods for creating digital files according to the present invention.

FIG. 2 illustrates steps that may be used in methods 200 for creating 102 digital files according to the present invention. Different scenarios may omit, repeat, rename, regroup, or reorder the illustrated steps without necessarily thereby departing from the scope of the claimed invention.

During a storing step 202, substantive data is stored in a file. This may be accomplished using conventional application programs such as word processors, spreadsheets, or database management software, to create files that are then processed (e.g., through use of a script that calls post-processing code) to make original inventive files from existing files. Alternatively, the functionality for placing 202 substantive content in a file may be part of a single executable file or a program with integrated code that inserts location claims and digital signatures to provide unique original files.

Likewise, the file that is receiving 202 data may be defined in a conventional file system such as those commonly used by Microsoft Windows systems, by UNIX/LINUX or similar systems, or by various commercially available systems from vendors such as Sun, IBM, or Dell. Alternatively, the storage units (sectors, clusters, blocks, etc.) which receive 202 data may be allocated using a proprietary file system. The invention may be used in conjunction with conventional data mirroring and/or data backup tools and techniques, although the conventional copies produced thereby will reside at different physical locations than the originals and will preferably therefore be treated as copies rather than originals unless and until the data is restored to its original physical location.

The data stored 202 in the file may pertain to any of a wide range of different fields, since many benefits of unique original files are not limited to a single field of endeavor. Possible sources of substantive data include deeds, royalty agreements, confidentiality agreements, loan agreements, mortgage agreements, other business contracts, wills, audits, governmental applications, permits, licenses, transcripts, minutes, and other legal documents, as well as technical logs or journals, notes, letters, pictures, and sound files, but are not limited to the foregoing.

An ascertaining step 204 ascertains the actual physical location of the storage units that hold the substantive data. It may also ascertain the actual physical location of storage units that hold location claims, digital signatures, and/or other data structures used to directly implement the invention. The location ascertained is preferably that of all storage units for the file, but some embodiments select one or more sample storage units and use that unit/those units to represent the file's physical location. The actual physical location is preferably more specific about location than a logical location identifier such as a mere domain name, mere file name, or mere URL, although it can include such a logical location identifier. For example, the physical location identifier may identify an IP address, a private network identifier, a CPU serial number, a particular fixed drive storage medium, and/or a particular removable drive storage medium like a CD or Iomega Zip disk, by using a characteristic (or combination of characteristics) that helps distinguish one physical location from another. This could be done by using one or more serial numbers, physical parameters such as the number of heads, tracks, and cylinders, and/or a manufacturer ID, for instance. It may also be possible to adapt techniques discussed in U.S. Pat. No. 5,615,061 for use in ascertaining 204 actual physical locations.

Alternately or in addition to specifying physical drive characteristics, the actual physical location may specify one or more particular storage units within that drive. This may be done, for example, by specifying a disk sector address, a file system cluster number, a file system block address, a memory address in a random access memory, or a tape address. Some embodiments may specify only one address per file. Other may use more detailed physical location identifiers, such as a starting sector address and an ending sector address, or a start sector plus a sector count, if the file is stored contiguously. If the file is not contiguous, a collection of {start address, end address} or {start address, sector count} pairs can be specified in the physical location identifier. If allocation units other than sectors are used, such as clusters or blocks, then similar information can be supplied, e.g., cluster numbers or block numbers. Despite their name, logical sector addresses may be suitable to distinguish a physical location identifier from a logical location identifier, because conventional systems typically hide from the user—and may change without obtaining user permission—the identity of the logical sector addresses being used at any given time to hold a given file's contents.

In some embodiments a physical location identifier includes both a logical location identifier and physical location information. The physical location information may be drive device identifiers or sector addresses as discussed above, for instance. The logical location identifier may be a file name; a directory path and file name; a volume name, directory path, and file name; or a URL, for instance. A logical location identifier may serve—by itself—as a physical location identifier in the limited situations in which more specific information about the file's physical location is not required for a valid claim because other claim limitations distinguish over the art; the comparing step of claim 1 is believed on filing to be such a limitation, so embodiments of claim 1 would include some in which a mere logical location identifier serves as a physical location identifier. In other situations, a physical location identifier should be understood to include more information about physical location than one finds in logical location identifiers.

Figure 5:
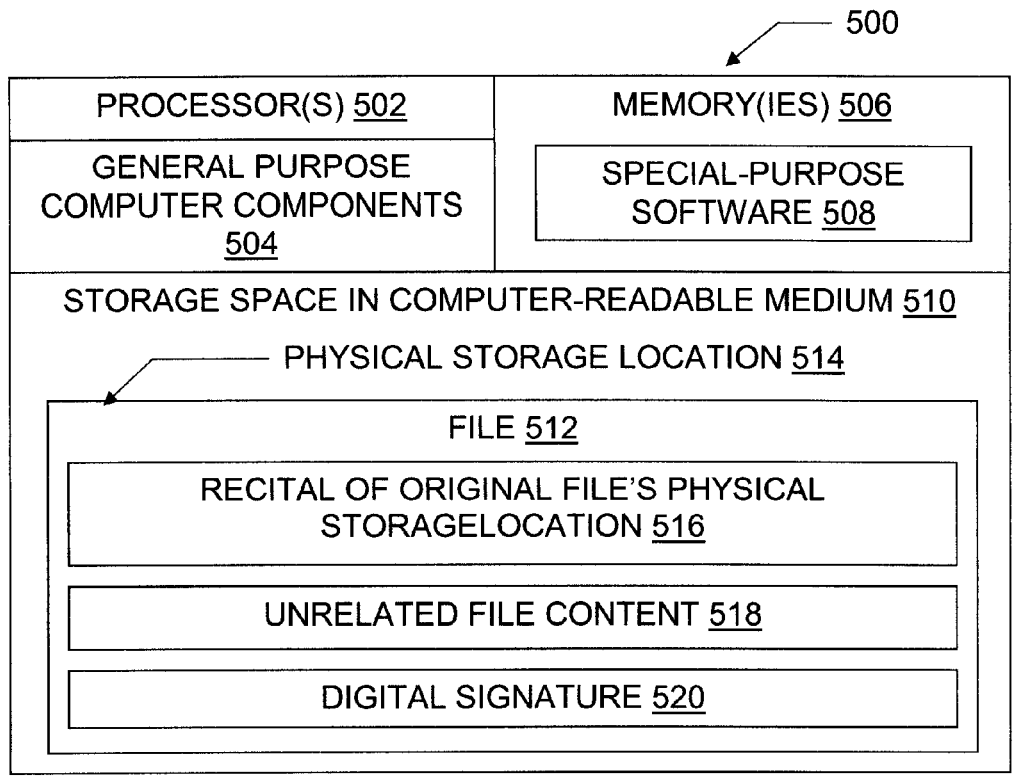
FIG. 5 is a block diagram illustrating a system and configured memories according to the present invention, in which a RAM memory is configured by software to perform method steps of the invention and a storage medium (such as non-volatile memory) is configured by a file containing both substantive content and a location claim.

A location claim providing step 206 finds an existing location claim associated with the file of step 204, or creates such a location claim if one does not already exist. A location claim is an assertion or expectation about the location of a file according to the invention. The location claim may be located inside the file, as illustrated in FIG. 5, for instance. The location claim may also be located outside the file, within a log, database, directory, or other data structure, in embodiments such as those illustrated and discussed in connection with FIGS. 6, 7, and 8. The general structure of location claims is not necessarily new; some pre-existing files contain text reciting the URL at which the file resides, for instance. However, location claim uses according to the present invention are believed to be new, and embodiments of the invention may include details about physical location that are apparently not provided in earlier work.

The location claim for the file in question is associated with the file, preferably during step 206, if it has not been previously associated with that file. However, the location claim may also be associated 214 with the file later, e.g., after the actual physical location is written 208 into the location claim and/or after metadata is associated 210 with the file. The association between a file and its location claim may be made by placing the location claim within the file at a predetermined position and/or with a predetermined flag or marker, for instance. Alternately, the location claim may be associated with the file by setting pointers, indices, addresses, similar position specifiers, or entries in a directory, log, bridge, or other data structure external to the file. For instance, association 214 may place the location claim in a supplementary document and create a bridge 802 between the file and the supplementary document without requiring in either document an embedded link to the other document. Alternately, association 214 may place the location claim in a database, directory, or other structure 606.

The location claim is preferably secured during step 206 if it has not been previously secured. However, the location claim may also be secured 212 later. Security reduces the risk of unauthorized changes to the location claim. Security can be provided through conventional file system access control, through encryption of the location claim, through digital signatures, hash digests, or checksums on the location claim (and possibly also on substantive content of the file), and/or through logs that track specific operations such as writing the location claim or moving the file associated with the location claim. In one embodiment, the location claim and the file are secured 212 by using a hash algorithm to generate a single digest of both the file and the claimed physical location identifier, and securely storing the hash digest so that it can be used to determine if the file or the location claim have been altered. The hash digest may be securely stored by using a Public Key Infrastructure, and/or access controls in a secure file system.

For clarity of explanation, a separately listed step 208 writes the file's actual physical location into the location claim; this writing could be considered part of location claim creation during step 206 and could be omitted in cases where step 206 finds an existing location claim with the claimed physical location identifier already present instead of creating a location claim. The important point is that the location claim is not merely a slot for holding information; in a unique original file F, the associated location claim contains a specific value which identifies the actual physical location of the file F. The written 208 physical location identifier can be more specific about the file's location than a mere logical location identifier would be.

During an optional metadata associating step 210, metadata can be associated with the file. Some examples of metadata include identification of the owner of the file, information about the file's history such as the creation date, and key words to assist in searches for the file. The metadata can be placed within the file, or it can be associated with the file by way of a database, bridge, or other external data structure.

Figure 3:
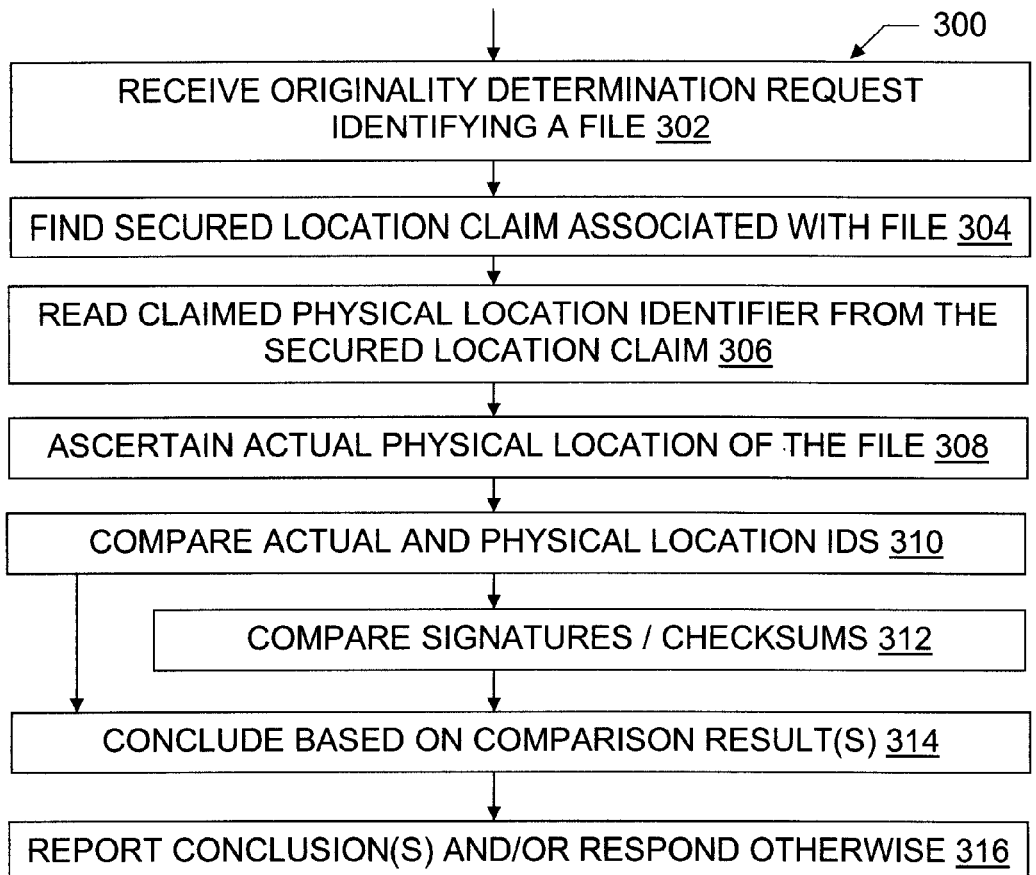
FIG. 3 is a flowchart illustrating steps that may be used in methods for verifying the originality of digital files, or determining that a file lacks originality, according to the present invention.

FIG. 3 illustrates steps that may be used in methods 300 for verifying 104 the originality of files, or determining 104 that a file lacks originality, according to the present invention. Different scenarios may omit, repeat, rename, regroup, or reorder the illustrated steps without necessarily thereby departing from the scope of the claimed invention. During a request receiving step 302, a request is received by software which performs verification. Alternately, verification may be performed on a random or a scheduled basis as a precaution, without explicit requests. The request or other impetus for testing a file's status identifies the file, e.g., by providing the file's name, or by providing a set of entry numbers, key words, or other constraints that limit the number of files to be checked.

A location claim finding step 304 finds the location claim (which is preferably secured 212) that is associated 214 with the file being verified. If location claims are stored within their respective files, they may be found by looking at a predetermined position in the file, for instance, or by scanning the file for a particular marker such as "EXPECTED LOCATION" or "#$L=", for instance. If location claims are stored in a log, directory, database, or collection of bridges outside the file, they may be found 304 by reading the log, by performing a directory lookup, by submitting a database query, or by scanning the bridge contents, respectively. The file name or a file handle may be a parameter to these finding 304 operations.

Once the location claim is found 304, the physical location identifier stored in it is read 306 from it. If the location claim is encrypted, reading 306 includes decryption. Likewise, if other operations are needed to satisfy the security measures before access is obtained to the physical location identifier stored in the location claim, then those operations should be performed 306.

An ascertaining step 308 ascertains the actual physical location of the file that is associated with the found 304 location claim. This may be done generally as discussed above in connection with ascertaining step 204. However, step 308 is numbered separately from step 204 to emphasize that embodiments do not necessarily use the same physical location ascertaining operations in each of the respective steps 204, 308.

A comparing step 310 compares the actual physical location of the file to the physical location identifier 306 read from the location claim. Some allowances may be made for syntactic differences, such as when one identifier specifies a start sector address with an end sector address and the other identifier specifies the same start sector address with a sector count that corresponds to the same end sector address; although different on their face, those two identifiers actually identify the same physical location. Likewise, a relative directory path (such as . . . \ . . . \deeds) and an absolute directory path (such as d:\lockbox\2001\saltlake\deeds) could be part of two different names for the same physical location.

A concluding step 314 makes a conclusion about the file's status, based on the results of the location comparing step 310 and optionally also on the result of a security testing step 312. Systems or methods embodying step 314, for instance, conclude that the file is original if the claimed physical location identifier identifies the actual physical location, and they conclude that the file is a copy if the claimed physical location identifier does not identify the actual physical location. A "copy" in this sense does not necessarily require the existence of the original file at its original physical location. Thus, using conventional file system utility software to merely move a file to another directory would make the resulting file a "copy" rather than an original. Although some embodiments make 314 a conclusion based solely on the result of comparing claimed and actual physical location, others go further by checking 312 the digital signatures, hash digests, or checksums to see if the data in the file has been altered.

An embodiment of the invention may report 316 something as simple as "the file is the original" because the claimed and actual physical locations match, or "the file is not the original" because the claimed and actual physical locations do not match. Or it may report 316 more complex results, such as "this is the original file and its contents are intact" (actual and claimed locations match, signature/checksum recomputed from file content matches signature/checksum previously computed and associated with the file), "this is the original file but its contents have been altered" (locations match, signatures/checksums do not), "this is a copy of the original, but the contents may have been altered by sophisticated means" (locations do not match, signatures/checksums match), or "this is a copy of the original, and its contents are different from the original" (locations do not match, signatures/checksums do not match). Instead of reporting 316 its conclusion, or in addition to doing so, an embodiment may take 316 one or more other actions in response to the testing steps 310-314, such as alerting an administrator by email or pager, for instance, or making an administrative log entry with information such as the date, time, file name and path, current user ID, and testing step 310, 314 results.

Figure 4:
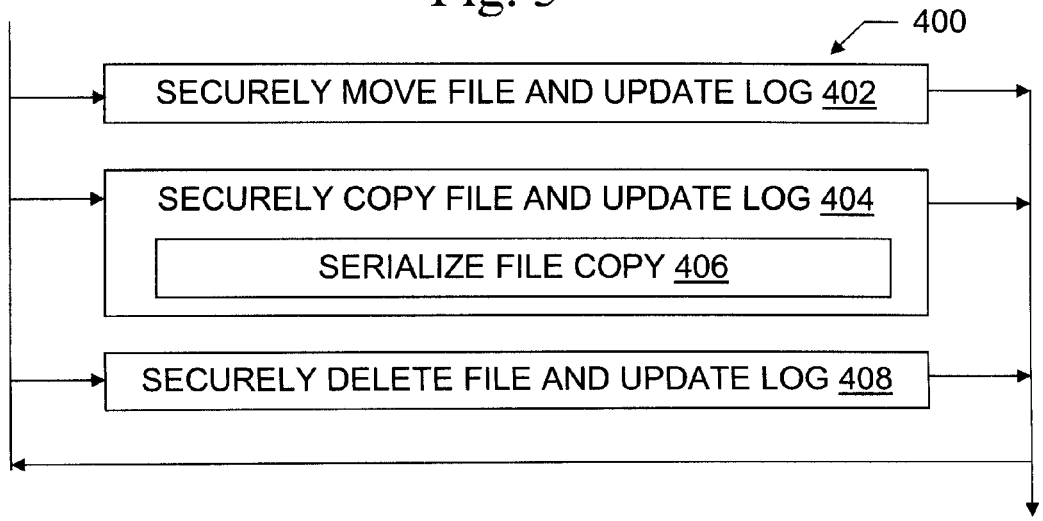
FIG. 4 is a flowchart illustrating steps that may be used in methods for managing digital files according to the present invention.

FIG. 4 illustrates steps that may be used in methods 400 for managing original files and copies of such files according to the invention. Different scenarios may omit, repeat, rename, regroup, or reorder the illustrated steps without necessarily thereby departing from the scope of the claimed invention.

During a moving step 402, an original file is moved from one physical location to another in storage. This is preferably done in a secure way, e.g., with file system access controls, to protect both the integrity of data in the file and the integrity of data about the file which is not necessarily in it, such as location claim and owner. The location claim associated with the file is updated to reflect the file's new physical storage location, and a new digital signature/checksum on it is computed and stored. Otherwise, the file will be treated as a copy during verification 104 because the claimed and actual physical locations will not identify the same storage location. The location claim is preferably secured, as discussed above, to prevent unauthorized changes to it. Some embodiments keep an administrative log intended to hold an audit trail of operations performed on the files, in which case the log is preferably updated 402 to reflect the movement of the file. The log is preferably secured by file access controls and/or other security barriers.

During a copying step 404, an original file is copied from one physical location to another in storage. This resembles moving 402, but the original file is left intact at the original physical location, with its associated location claim (and metadata, if any) left unchanged. However, a log entry may be made 404 to indicate that a copy was created. The copy may be serialized 406, namely, it may have embedded within it or otherwise associated with it a serial number or other identifier that distinguishes it from any other copies (potential or extant) of the original file in question. A copy of an original file may itself be treated as an original file, e.g., by maintaining and verifying the match between actual and claimed physical locations of the copy, and by maintaining and verifying a digital signature, digest, or checksum on the copy's digital content. However, the copy contains a serial number or is subject to another indication that it is a copy of an original file, and it preferably shares a file name with the original or contains other information that permits an administrator to locate the original from which the copy was made.

During a deleting step 408, an original file is deleted from storage. If an administrative log is being kept, it is preferably updated to reflect the deletion. The location claim associated with the file may be updated to reflect deletion (e.g., by setting a flag or by setting the claimed location to NULL), or it may be simply deleted itself. With respect to file system structures, deletion may occur solely in the directory and file allocation table or like data structure, as is done for instance in deleting a file under MS-DOS. Alternately, deletion may be a secure deletion, in which sectors that hold the file's data are not merely marked free for reuse but are also overwritten to electronically "shred" the file by making it difficult to recover the data from storage. Conventional shredding techniques for secure file deletion may be used. File moves, copies, and/or deletions are not themselves claimed, but their use with original files subject to identification/comparison of claimed/actual physical location as described herein is believed to be new.

Systems

FIG. 5 illustrates a computer system 500 and configured memories 506 according to the present invention. The system 500 includes one or more processors 502, which may be general purpose processors such as CPUs or computing nodes in a network, or special purpose processors such as ASIC or FPGA hardware. The system is configured by instructions to make the processors perform methods of the invention and otherwise operate in ways described herein. Other general purpose components 504 may also be part of the system 500, such as network cards, I/O equipment, BIOS ROM, and so on. The general purpose processors, if present, are configured by software instructions 508 in ROM or RAM 506 to perform method steps of the invention. A storage medium 510 (such as nonvolatile memory) is configured by a file 512 containing both substantive content 518 and (in this illustrated embodiment) a location claim 516. The file resides at a specific physical location 514 in storage 510. The illustrated file 512 also contains a digital signature 520 which is computed based on at least the substantive content 518, and preferably also on the location claim 516, to permit testing 312 for tampering.

The following description of a portion of the system 500 was given in the provisional application to which priority is claimed. For convenience it is repeated here, with modifications for consistency with the present application. The drawing in FIG. 5 illustrates one embodiment of the invention. A storage medium contains storage space 510 for magnetically, optically, or otherwise mechanically storing data in machine-readable signals. A file 512 is stored within the storage space commencing at point 514. A description 516 of the physical location of point 514 and the length or size of the file 512 is written within the file; this is an example of a location claim embedded within an original file. In this drawing the recital 516 of the file's physical location is shown at the beginning of the file 512, but other configurations would be possible, such as placing the location claim 516 at the end of the file or somewhere in the middle of the file 512. The file 512 normally contains substantive content 518, such as text, images, hyperlinks, and/or other digital data; examples include contract provisions, deed descriptions of real property, and so on. A digital signature 520 or hash digest 520 helps prevent undetected tampering with the file contents 516, 518, and 520; checksums, encryption, compression, time-stamps, error correcting codes, and other familiar file protection or enhancement tools and techniques may also be used.

If the file 512 is stored contiguously, then the recital 516 can be a disk sector address and sector count, or it can be a start sector address and an end sector address, for instance. Blocks or clusters may be used by the file system instead of using disk sectors directly. If the file 512 is not stored contiguously, then the recital 516 can include a list of sectors/clusters, blocks, a list of sector/cluster/block runs, or another data structure. Data structures used by file systems to record the location of storage units (e.g., sectors, clusters, or blocks) on a disk or other physical storage medium can be readily adapted for use as location recitals 516 according to the invention.

The invention may be used with stand-alone computers 500, with computers 500 connected to a network, or both. The computers 500 may be workstations, desktop computers, laptop computers, palmtop computers, mobile computers, servers, clients, peers, or other computers. Suitable networks include local area networks, metropolitan area networks, wide area networks, the Internet, or any combination thereof. "Internet" as used herein includes variations such as a private Internet, a secure Internet, a value-added network, a virtual private network, a portion of the Internet such as the World Wide Web, or an intranet. Storage 510 may be in a computer's memory or on its hard disk, floppy disk, CDROM, DVD or tape.

The physical location identifier specifies the location of the file on a non-volatile storage medium, such as a magnetic or optical disk, or within flash memory. A mere file name and directory path are not normally sufficient as a physical location identifier, because a file system normally permits a file to be moved to different storage sectors and/or to have its content changed without necessarily changing the file's name and directory path.

One embodiment includes a computer 500 with a CPU 502 that has a serial number. The physical devices 504 that make up the components of the computer 500 and the apparatus for communicating with any storage devices 510 that the computer 500 may be capable of using may be physically secured by use of cables, locks and seals. Logs may be kept of any alterations of the system performed by maintenance personnel, e.g., changing devices, or manipulating 106 files. The storage device 510 may be given a unique identifier such as a label for a floppy disk or a serial number for a hard drive. Any storage 510 that can be separated from the computer 500, such as a floppy disk, may be registered physically with a system capable of certifying its presence and any administrative movements that it may undergo prior to being re-attached to the computer 500. The computer 500 itself may be given unique physical location identifiers including information such as IP addresses, private network identifiers, etc. The file's physical location may then be identified 204, 308 hierarchically by computer, file storage unit, and physical storage location within the file storage unit, such as clusters or tracks, sectors and blocks.

In another embodiment with less stringent security requirements, a file may only be identified by its physical location on a hard drive in a desktop computer. In yet another embodiment, a file may be uniquely identified by its physical location on a non-volatile storage unit that is a component of a file server or a web server.

Figure 6:
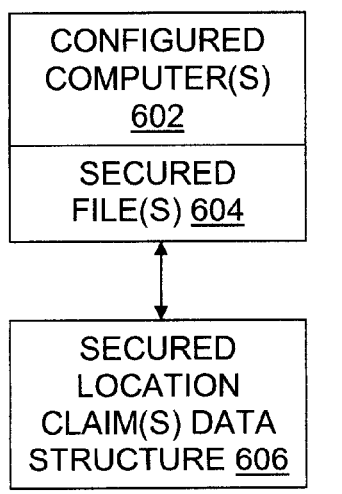
FIG. 6 is a block diagram illustrating a system and memory configuration which is an alternative to that shown in FIG. 5, in which location claims are stored outside the file within a database, directory, and/or other data structure configuring system memory.

FIG. 6 is a block diagram illustrating a system and memory configuration which is an alternative to that shown in FIG. 5. One or more configured computers 602 are present; they comprise computer(s) 500 but their storage is configured differently than the storage shown in FIG. 5. One or more secured files 604 are stored in storage accessible to the computer(s) 602. Unlike the file(s) 512, the file(s) 604 do not necessarily contain location claims. Instead, some or all of the location claim(s) associated with the file(s) 604 are stored outside their respective file(s) 604, being stored within a database, directory, and/or other external data structure 606 configuring system memory. For instance, location claims may be stored in database records 606 in a relational or other database, with record fields such as "claimed physical location of file", "owner of file", and/or other metadata that accompany the claimed physical location identification.

Figure 7:
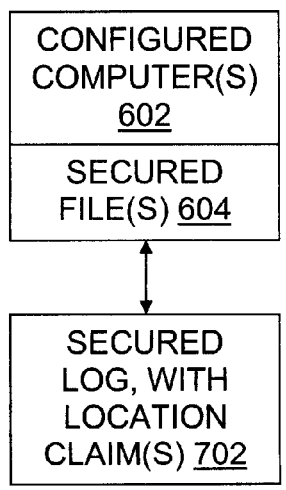
FIG. 7 is a block diagram illustrating a system and memory configuration which is an alternative to that shown in FIG. 5, in which location claims are stored outside the file within a secured log.

FIG. 7 is a block diagram illustrating a system and memory configuration which is another alternative to that shown in FIG. 5. In this embodiment, location claims are stored outside the files 604 within a secured log 702. The log also contains audit information, such as the timestamp and user ID for the initial creation 102 of the file 604, time-stamps and user IDs for requests to verify 104 the file 604, and/or timestamps and user IDs for attempts to copy 404, move 402, delete 408, print, read 108, or otherwise use the file 604, and their resulting outcomes. The log may be secured with file system access controls, digital signatures/checksums, and/or other tools and techniques.

Figure 8:
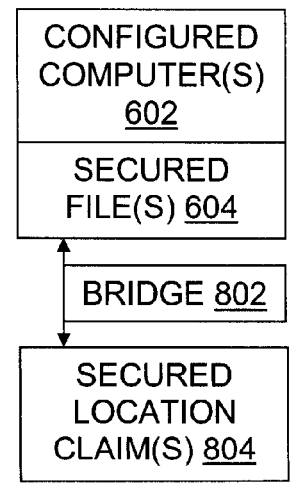
FIG. 8 is a block diagram illustrating a system and memory configuration which is an alternative to that shown in FIG. 5, in which location claims are stored outside the file and associated with the file via a bridge structure.

FIG. 8 is a block diagram illustrating a system and memory configuration which is yet another alternative to that shown in FIG. 5. In this embodiment, location claims are stored outside the file and are associated with the file via a bridge structure 802. One suitable bridge structure is described in U.S. Pat. No. 5,905,991, incorporated herein, which has the same inventor as the present invention. The bridge 802 for a given file 604 includes an identifier for locating the file; this may be a logical location identifier. The bridge 802 also contains an identifier identifying the location claim (or the claimed physical location identifier therein) for the file; this may be a pointer or index into a secured log, database, or other collection of location claims. In embodiments that conform with U.S. Pat. No. 5,905,991, these two identifiers correspond to a target token identifier and a supplementary token identifier in a coupling, respectively. The bridge 802 is preferably secured using file system access controls, digital signatures/checksums, and/or other measures.

Configured Media

Articles of manufacture within the scope of the present invention include a computer-readable storage medium in combination with the specific physical configuration of a substrate of the computer-readable storage medium. The substrate configuration represents data and instructions that cause the computers to operate in a specific and predefined manner as described herein, e.g., to perform methods illustrated in one or more of FIGS. 1 through 4. Suitable storage devices include floppy disks, hard disks, tape, CD-ROMs, RAM, and other media readable by one or more of the computers. Each such medium tangibly embodies a program, functions, and/or instructions that are executable by the machines to perform inventive methods such as those for recognition 104 of originals of files according to the present invention.

The invention also includes configured media structures which do not necessarily contain instructions. For instance, one embodiment includes a computer memory such as one or more memories 506 which is individually or collectively configured by (a) data to form a structure comprising a file having an actual physical location, and (b) a location claim containing a claimed physical location identifier which identifies the actual physical location of the file and is more specific about location than a mere logical location identifier, and wherein the location claim is structurally associated with the file. The location claim may be structurally associated with the file by being embedded within the file, as illustrated in FIG. 5, for instance, or by way of a bridge 802, or through a directory, log, database, or other data structure (e.g., FIGS. 6, 7) outside the file which structurally associates the location claim with the file.

Review

In some embodiments, the present invention provides tools and techniques for distinguishing a file from any or all copies of the file that may exist. One method ascertains 204 the actual physical location of the file 512 and associates 214 that physical location with the file as the claimed physical location 516 of the file. The file's originality status may then be determined 104 by finding 304 the location claim, reading 306 from it the claimed physical location identifier associated with the file, ascertaining 308 the actual physical location of the file, and comparing 310 the identified locations. If the claimed and actual locations are identical, then the file is the original file it claims to be. If there is disparity between the claimed physical location recited for or by the file and the actual physical location of the file, then it is not the original file it claims to be. Methods are provided for creating 102, verifying 104, moving 402, copying 404, deleting 408, reading 108, logging operations on, and otherwise using such files. The methods may be implemented in software configuring a general purpose computer 500, or they may be implemented in special purpose hardware. They may be embodied in a computer-readable medium such as a removable tape or disk, or a CD or DVD, for instance.

Some embodiments provide a method for determining whether a given file stored on a computer-readable storage medium is an original or a copy, the method including the computer implemented steps of: reading a claimed physical location identifier from a secured location claim that is associated with the file; ascertaining the actual physical location of the file; comparing the claimed physical location identifier to the actual physical location; and concluding that the file is original if the claimed physical location identifier identifies the actual physical location, and concluding that the file is a copy if the claimed physical location identifier does not identify the actual physical location. In some embodiments, the claimed physical location identifier identifies at least one of: a particular fixed drive storage medium; a particular removable drive storage medium; a disk sector address; a file system cluster number; a file system block address; a memory address in a random access memory; a tape address. In some embodiments, the claimed physical location identifier includes both a logical location identifier and physical location information, and the logical location identifier includes at least one of: a file name; a directory path and file name; a volume name, directory path, and file name; a Uniform Resource Locator. In some embodiments, the location claim is secured by at least one of: a checksum; a hash digest; a digital signature.

Some embodiments further include the step of associating the location claim with the file by performing at least one of: placing the location claim within the file; placing the location claim in a supplementary document and creating a bridge between the file and the supplementary document without requiring in either document an embedded link to the other document; placing the location claim in a database containing location claims; placing the location claim in a directory containing location claims.

In some embodiments, the location claim and the file are secured by using a hash algorithm to generate a single digest of both the file and the claimed physical location identifier, and securely storing the hash digest so that it can be used to determine if the file or the location claim have been altered. In some, the hash digest is securely stored by using at least one of: a Public Key Infrastructure, access controls in a secure file system.

Some embodiments further include the steps of securely moving the file to a new physical location; and entering in a secure log a new claimed physical location identifier which identifies the file's new physical location. Some further include the steps of securely copying the file to another physical location; entering in a secure log a claimed physical location identifier which identifies the file copy's physical location; and noting in the secure log that the file was copied as opposed to being moved. Some further include the step of associating a serial identifier with the file copy, whereby the method provides a serialized copy of the file. Some further include the steps of securely deleting the file; and noting in the secure log that the file was deleted. Some further include the step of associating an owner identifier with the file. Some further include the step of using the file by at least one of: reading data from the file, printing on paper a copy of data from the file.

Some embodiments include a method for creating an original file which can be distinguished from a copy of the file, the method including the computer implemented steps of: storing data in a file on a computer-readable storage medium; ascertaining the actual physical location of the file; writing, in a location claim, a claimed physical location identifier which identifies the actual physical location of the file and is more specific about location than a mere logical location identifier; associating the written location claim with the file if they are not already associated with each other; and securing the location claim. In some embodiments, the storing step stores data in at a least one of: a single contiguous region of disk sectors, multiple runs of disk sectors. In some embodiments, the storing step stores data on at a least one of: a fixed drive storage medium; a removable drive storage medium; a mirrored storage medium; a backup storage medium. In some, the writing step writes a claimed physical location identifier which identifies at least two of: a disk sector address; a file system cluster number; a file system block address; a memory address in a random access memory; a tape address; a CPU serial number; an IP address; a private network identifier. In some, the writing step places the location claim within the file and thereby associates it with the file. In some, the writing step places the location claim outside the file and the associating step includes at least one of: placing the location claim in a supplementary document and creating a bridge between the file and the supplementary document without requiring in either document an embedded link to the other document; placing the location claim in a database containing location claims; placing the location claim in a directory containing location claims.

In some embodiments, the step of securing the location claim includes at least one of: computing a checksum of at least the claimed physical location identifier; computing a hash digest of at least the claimed physical location identifier; computing a digital signature of at least the claimed physical location identifier. Some further include the step of securing the file by performing at least one of: computing a checksum of at least some data in the file; computing a hash digest of at least some data in the file; computing a digital signature of at least some data in the file; computing a single checksum of at least some data in the file and the claimed physical location identifier; computing a single hash digest of at least some data in the file and the claimed physical location identifier; computing a single digital signature of at least some data in the file and the claimed physical location identifier.

Some embodiments provide a computer-readable storage medium configured with software to perform a method for determining whether a given file stored on a computer-readable storage medium is an original or a copy, the method including the computer implemented steps of: reading a claimed physical location identifier from within the file; ascertaining the actual physical location of the file; comparing the claimed physical location identifier to the actual physical location; and concluding that the file is original if the claimed physical location identifier identifies the actual physical location, and concluding that the file is a copy if the claimed physical location identifier does not identify the actual physical location.

Some embodiments provide a computer-readable storage medium configured with software to perform a method for creating an original file which can be distinguished from a copy of the file, the method comprising the computer implemented steps of: storing data in a file on a computer-readable storage medium; ascertaining the actual physical location of the file; and writing into the file a claimed physical location identifier which identifies the actual physical location of the file and is more specific about location than a mere logical location identifier.

Some embodiments provide a computer system for managing original files, including: a computer-readable storage medium for storing original files; a processor operably coupled with a memory configured with software to perform a method for determining whether a given file stored on the computer-readable storage medium is an original or a copy, the method including the computer implemented steps of: reading a claimed physical location identifier from a secured location claim that is associated with the file; ascertaining the actual physical location of the file; comparing the claimed physical location identifier to the actual physical location; and concluding that the file is original if the claimed physical location identifier identifies the actual physical location, and concluding that the file is a copy if the claimed physical location identifier does not identify the actual physical location. In some embodiments, the method performed by the software includes the steps of securely moving the file to a new physical location; and entering in the location claim a claimed physical location identifier which identifies the file's new physical location. In some embodiments, the method performed by the software includes the steps of securely copying the file to another physical location; and entering in a location claim a claimed physical location identifier which identifies the file copy's physical location. In some, the method performed by the software includes the step of associating a serial identifier with the file copy, whereby the method provides a serialized copy of the file. In some, the method performed by the software includes the step of securely deleting the file. In some, the method performed by the software includes the step of associating metadata with the file.

Some embodiments provide a computer system for managing original files, including: a computer-readable storage medium for storing original files; a processor operably coupled with a memory configured with software to perform a method for creating an original file which can be distinguished from a copy of the file, the method including the computer implemented steps of: storing data in a file on a computer-readable storage medium; ascertaining the actual physical location of the file; writing, in a location claim, a claimed physical location identifier which identifies the actual physical location of the file and is more specific about location than a mere logical location identifier; associating the written location claim with the file if they are not already associated with each other; and securing the location claim. In some embodiments, the method performed by the software includes the steps of securely moving the file to a new physical location; and entering in the location claim a claimed physical location identifier which identifies the file's new physical location. In some, the method performed by the software includes the steps of securely copying the file to another physical location; and entering in a location claim a claimed physical location identifier which identifies the file copy's physical location. In some, the method performed by the software includes the step of associating a serial identifier with the file copy, whereby the method provides a serialized copy of the file. In some, the method performed by the software includes the step of securely deleting the file. In some, the method performed by the software includes the step of associating metadata with the file.

Some embodiments provide a computer memory configured by data to form a structure comprising a file having an actual physical location, and a location claim containing a claimed physical location identifier which identifies the actual physical location of the file and is more specific about location than a mere logical location identifier, wherein the location claim is structurally associated with the file. In some embodiments, the location claim is structurally associated with the file by being embedded within the file. Some embodiments include a bridge outside the file which structurally associates the location claim with the file by a pair of identifiers in a coupling.

ADDITIONAL EXAMPLES

Software Authentication

Steps
1. Software is installed on digital storage medium— Memory, Hard drive, diskette, CD etc.
2. Physical location at which software is installed is obtained
3. Physical location at which software is installed is converted to a standard format
4. Physical location at which software is installed is stored—memory, physical medium local, remote etc.
5. Physical location at which software is installed is appended to or otherwise associated with the software—physically or virtually—and a hash (hash1) is taken of the combination.
6. Hash1 is stored—memory, physical medium local, remote etc.
7. At runtime, physical location at which software is installed is obtained.
8. Physical location is combined with software and has (hash2) is taken
9. Hash1 is compared to hash2.
10. If hash1 is not equal to hash2, the failure may be:
    a. Reported to remote location
    b. Logged for future reference and/or
    c. Trigger to terminate execution.
11. Log is made of action taken—memory, physical medium local, remote etc.

Authentication of Copyright Materials
Steps
1. Copyright material is written to digital medium— Memory, cd dvd tape diskette etc.—using device that is also capable of writing a label on the medium.
2. Unique identification for the medium is generated
3. The identification is written on the medium
4. The physical location of the copyright material on the medium is obtained, including the identification that was written on the medium.
5. The physical location of the copyright material, including the identification that was written on the medium, is combined with the copyright material—physically or virtually via a link—
6. The combined copyright material and physical location, including the ID of the medium, are hashed (hash1)
7. Hash1 is stored—locally (including on the medium) or remotely—for reference.
8. At the time the copyright material is to be accessed, the material is read from the medium, the physical location of the copyright material is obtained—including the identification of the medium.
9. The copyright material is combined with the identification
10. A hash (hash2) is taken of the combination.
11. Hash1 is retrieved
12. Hash1 is compared with hash2.
13. If hash1 is equal to hash2, then the copyright material is deemed authentic.

Software and Mechanical System Using Authentication of Copyright Materials to Protect Copyright Materials
1. Utilize the "Method to protect private information" described below
2. Store license information
3. Utilize protections of Self Reading Data described below.
4. As part of reader authentication, verify currency and existence of license.

Self-Reading Data (e.g., Self-Extracting *.Zip Files)
1. Combine data with executable software so that when a program calls for the data:
    a. The executable:
        i. Authenticates the data (using "D-Original" technology, e.g., as in '774 application)
        ii. Authenticates the calling Program
    b. If authentication is successful
        i. Executable reads and decrypts data
        ii. Delivers data to memory buffer where calling program can make use of it.
2. Program authentication:
    a. Calling program identifies itself to ExeData embodiment of invention (see FIG. 9 for example)
    b. ExeData queries system for location on media where program is stored.
    c. ExeData compares location & hash with stored values
    d. If equal,
        i. Deliver data to buffer specified by calling program.
3. ExeData self-install
    a. When ExeData first runs
        i. Creates registry or cookie
        ii. Stores authenticating data (encrypted) for itself and calling programs
        iii. Secures stored data with d-original Device to Read Physical (Non-Digital) Id from Portable Digital Media Some embodiments use a product that is capable of printing labels on a cd or dvd while it is spinning in the drive. This allows a Kiosk to both write data to the cd and print variable information in a customized label. This helps assure that the data and the label are matched appropriately to each other. A device that is capable of reading digital data from digital media is also fitted with the capability of reading physical data such as bar codes, MICR characters and/or any other non-digital information.

Method to Protect Private Information

In the course of business, it is frequently necessary to deliver digital information on portable media disconnected from any network or computer system. Examples might be the delivering of electronic copies of a mortgage that had been transacted entirely in non-paper formats or the delivering of medical information from a doctor to a patient or the delivering of electronic documents from an attorney to a client. IN these cases privacy is very important. In the medical case, privacy is mandated by HIPAA law. Some embodiments help meet such goals.

Steps
1. Unique identifier for media is obtained or generated and is permanently named on media.
2. Information is written on the media
3. physical location of information on the media is obtained—including the identifier of the media
4. The physical location of the information—including the media ID—is combined with the information.
5. The combination is hashed (Hash1) and the hash is written on the media To authenticate the information
1. Read the media ID that is marked on the media.
2. obtain the physical location of the information on the media
3. Read the information from the media.
4. Combine the location—including the media ID—and the information
5. Hash the combination (hash2)
6. compare hash1 and hash2.
7. if hash1 is equal to hash2, conclude:
    a. that the media is the same that was originally received and
    b. that the information is un-altered.
8. To protect information from being read by an unauthorized reader—utilize the protection of self reading data discussed above.

Device for Conforming Paper Documents to Reflect Electronic Action Relating to the Paper as Part of Electronic Transactions
Steps
1. A paper document is converted to electronic record.
2. While in electronic format, the record undergoes a process that would normally be memorialized by placing a visible mark on the original paper, e.g.,
    a. Signature or endorsement
    b. Notary
3. The record is marked in some way to memorialize the process by:
    a. Appending digital notation, or
    b. Altering record content, or
    c. Creating notation that points of links to the record.
4. The electronic process may be noted and archived.
5. The paper from which the record was derived is marked to give notice of or to indicate the occurrence of the electronic process:
    a. Automatically by electronically controlled process e.g., printer
    b. Manually by electronic process e.g., handheld electronically controlled printer.

Secure Transport of ExeData Materials
Steps
1. Create and store new ExeData
2. Copy to new location
3. test authentication
4. If OK
    a. Obtain new physical location
    b. Replace old physical location in ExeData with new
    c. Obtain hash including new location
    d. Update Exedata to include
        i. ID
        ii. New physical location
        iii. New hash Transferable Record Vault
Requirements for transferable records are set out in UETA law section 16 and ESIGN law. Both statutes state that for an electronic copy to satisfy a law that requires an original, the electronic copy must remain accessible. Even though the transferable records section does not make the same requirement, if a document originates in paper form, it may have to rely on UETA to get safely into a transferable record store. The new article 7 of UCC allows for documents to be converted between physical and electronic media but doesn't specify how—UETA could control. UCC3 does not specify and UETA 16 refers to section 3.

One may conclude that the only description of how to make an electronic copy "satisfy" a requirement in a law for an "original" is UETA Section 11(a) & (d). In a loss of accessibility, not only is access lost, but the qualification to "satisfy" a law that requires retention or original. Thus, a system that can track and deliver an actual "original" would avoid the "accessibility" qualifier.

Note that statements herein about legal requirements of UETA, UCC, and other statutes are not provided as legal opinions, but are instead background for the technology and personal opinion of the inventor.

Steps
1. Using D-original technology (e.g., as in '774 application), tamper proofing (e.g., digital signatures), and linking technology (e.g., as in U.S. Pat. No. 5,905,991),
    a. Create original records & identifiable copies
    b. Secure them cryptographically
    c. Manage links externally w/o altering file or violating tamper-seal.

ContainerID=URL:MediaID or PacketID or MAC Address while in transit or MemLoc. Etc.
AuthID=License ID, Privacy Code or other authorizing identifier.

If Local and not authorized:
  Encrypt file using ContainerID:Physical location as seed value for encryption.
  Store file in DB by ContainerID:Physical location.
  Store Links in DB by ContainerID:Physical location.
  Audit trail DB indexes by ContainerID:Physical location.
  Use audit trail to obtain original ContainerID:Physical Location for decryption after valid transport or to discover that the current instance is in the chain but not the currently authorized version.
  To Read file,
    Obtain ContainerID
    Obtain Physical location
    Decrypt using ContainerID:Physical location as key
    Compare actual ContainerID and physical location with values written in file, if needed If Local and licensed or private Data file:
  Encrypt Data file including ContainerID:Physical Location of original file at install time using ContainerID:Physical location:AuthID as key.
  Store license info in DB by the ContainerID:Physical location derived at install.
  Store file in DB by ContainerID:Physical location.
  Store Links in DB by ContainerID:Physical location.
  Audit trail DB indexes by ContainerID:Physical location.
  Use audit trail to obtain original ContainerID:Physical Location for decryption after valid transport or to discover that the current instance is in the chain but not the currently authorized version.
  Append AuthID
  Obtain Physical location
  Encrypt Data file combined with AuthID using ContainerID:Physical location as key.
  On reading, obtain ContainerID
  Obtain Physical location
  Use ContainerID:Physical location to decrypt combination of data file and License.

Use ContainerID:Physical location as key to decrypt AuthID

Use ContainerID:Physical location:AuthID to Decrypt Data file

Compare actual ContainerID and physical location with D-Original ContainerID:Physical Location as written in file for secondary validation if needed.

Compare AuthID online for validation.

If not local: include url in ContainerID

To move an original file, update the audit trail DB and append the previous URL:ContainerID:Physical location to the existing file and encrypt the combination using the new URL:ContainerID:Physical location as the seed for new encryption.

At read-time, onion skins of physical locations provide object level history, and audit trail provides a database that tracks physical locations. Security is provided in that without the layered location keys, the decryption of the original file will not be achieved.

Conclusion

Although particular embodiments of the present invention are expressly illustrated and described individually herein, it will be appreciated that discussion of one type of embodiment also generally extends to other embodiment types. For instance, the description of the methods illustrated in FIGS. 1-4 also helps describe the systems in FIGS. 5-8, and vice versa. Likewise, the description of file and other data structures in FIGS. 5-9 also helps describe algorithms for creating, manipulating, modifying, and freeing such data structures. The method and system discussions also help describe various configured media embodiments of the invention.

As used herein, terms such as "a" and "the" and designations such as "report", "data structure", and "file", are inclusive of one or more of the indicated item or step. In particular, in the claims a reference to an item generally means at least one such item is present and a reference to a step means at least one instance of the step is performed.

Those of skill in the art will recognize that an embodiment of the present invention need not include all parts of the architecture described above. The invention may be embodied in other specific forms without departing from its spirit or essential aspects. The described embodiments are to be considered in all respects only as illustrative and not restrictive. All claims as filed are part of the specification and thus help describe the invention, and repeated claim language may be inserted outside the claims as needed. The scope of the invention is, therefore, indicated by the appended claims rather than by the foregoing description. All changes that come within the meaning and range of equivalency of the claims are to be embraced within their scope.

What is claimed and desired to be secured by patent is:

1. A method of analyzing authenticity based in part on one or more physical locations, the method comprising the steps of:

a calling program causing a self-extracting executable program to run;

the self-extracting executable program attempting to authenticate data by steps which include:

reading a claimed physical location identifier associated with the data;

ascertaining an actual physical location of the data;

comparing the claimed physical location identifier to the actual physical location of the data; and deeming the data authentic only if the claimed physical location identifier associated with the data matches the actual physical location of the data;

the self-extracting executable program attempting to authenticate the calling program by steps which include:

reading a claimed physical location identifier associated with the calling program;

ascertaining an actual physical location of the calling program;

comparing the claimed physical location identifier to the actual physical location of the calling program; and deeming the calling program authentic only if the claimed physical location identifier associated with the calling program matches the actual physical location of the calling program; and associating at least one claimed physical location identifier by performing at least one of:

placing the claimed physical location identifier within a file, the file containing at least one of: the calling program, the data;

placing the claimed physical location identifier in a supplementary document and creating a bridge between a file and the supplementary document without requiring in either document an embedded link to the other document, the file containing at least one of: the calling program, the data;

placing the claimed physical location identifier in a database containing claimed physical location identifiers;

placing the claimed physical location identifier in a directory containing claimed physical location identifiers.

2. The method of claim 1, further comprising securely storing the data and securely storing a claimed physical location identifier which is associated with the data.

3. The method of claim 1, further comprising the steps of securely moving a file to a new physical location, the file containing at least one of: the calling program, the data; and entering in a secure log a new claimed physical location identifier which identifies the file's new physical location.

4. The method of claim 1, further comprising the steps of securely copying a file to another physical location thereby creating a file copy, the file copy containing at least one of: the calling program, the data; entering in a secure log a claimed physical location identifier which identifies the file copy's physical location; and noting in the secure log that the file was copied as opposed to being moved.

5. The method of claim 4, further comprising the step of associating a serial identifier with the file copy, whereby the method provides a serialized copy of the file.

6. The method of claim 1, further comprising the steps of securely deleting a file which contains at least one of: the calling program, the data; and noting in the secure log that the file was deleted.

* * * * *